United States Patent [19]

Oi

[11] Patent Number: 5,244,166
[45] Date of Patent: Sep. 14, 1993

[54] HANDLE FIXING STRUCTURE FOR SPINNING REEL

[75] Inventor: Takeshi Oi, Sakai, Japan

[73] Assignee: Shimano, Inc., Osaka, Japan

[21] Appl. No.: 879,720

[22] Filed: May 6, 1992

Related U.S. Application Data

[63] Continuation of Ser. No. 614,122, Nov. 16, 1990, abandoned.

[30] Foreign Application Priority Data

Nov. 20, 1989 [JP] Japan .................. 1-134488[U]

[51] Int. Cl.[5] .................................... A01K 89/00
[52] U.S. Cl. .................................... 242/284
[58] Field of Search .................. 242/282, 284; 74/547

[56] References Cited

U.S. PATENT DOCUMENTS

| 227,000 | 4/1880 | Hancock | 74/547 |
|---|---|---|---|
| 1,597,347 | 8/1926 | Fildes | 74/547 |
| 2,162,173 | 6/1939 | Huntington, Jr. | 242/284 X |
| 2,690,309 | 9/1954 | Cuonz et al. | 242/284 X |
| 2,745,607 | 5/1956 | Taggart et al. | 242/282 X |
| 2,761,484 | 9/1956 | Sternick et al. | 411/353 |
| 2,799,457 | 7/1957 | Martini | 242/282 |
| 3,948,117 | 9/1976 | Kimura | 242/284 X |
| 4,368,856 | 1/1983 | Neufeld | 242/284 |
| 4,369,930 | 1/1983 | Noda | 242/282 |
| 4,784,396 | 11/1988 | Scott et al. | 277/235 B |
| 4,850,549 | 7/1989 | Sakumoto | 242/282 X |

FOREIGN PATENT DOCUMENTS 2208692 6/1974 France .
56-40314 9/1981 Japan .

*Primary Examiner*—Daniel P. Stodola
*Assistant Examiner*—John P. Darling
*Attorney, Agent, or Firm*—Dickstein, Shapiro & Morin

[57] ABSTRACT

A handle fixing structure for a spinning reel which comprises a fixing bolt for compatibly maintaining a handle lever in an operational position and a handle shaft. The structure facilitates pivotal movement for folding the handle lever and reliably prevents slack of the bolt. The handle fixing structure is formed of a reel body, a sleeve shaft rotatably supported inside the reel body, a handle support shaft detachably fitted into and supported by the sleeve shaft for torque transmission, a handle lever foldably and pivotably supported by the handle support shaft, a fixing bolt inserted into the sleeve shaft from an end thereof opposite to the end for attaching the handle support shaft to be fixedly screwed to an inserting end of the handle support shaft, thereby to maintain the handle lever in a fixed operational position. The fixing bolt can be loosened to permit the handle lever to be foldably pivotable. An anti-slack element made of resin material is disposed between the sleeve shaft and the fixing bolt. The anti-slack element is unrotatable and axially slidable relative to the sleeve shaft, and threadedly receives the fixing bolt.

6 Claims, 2 Drawing Sheets

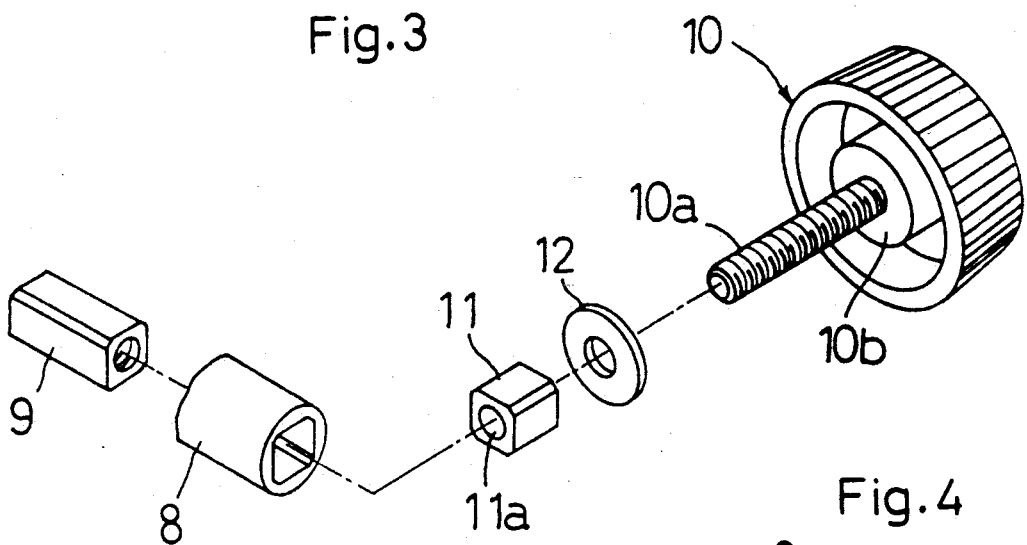
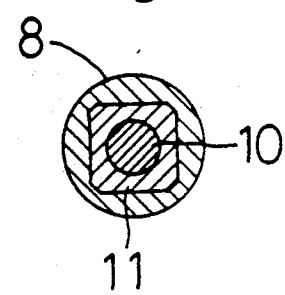
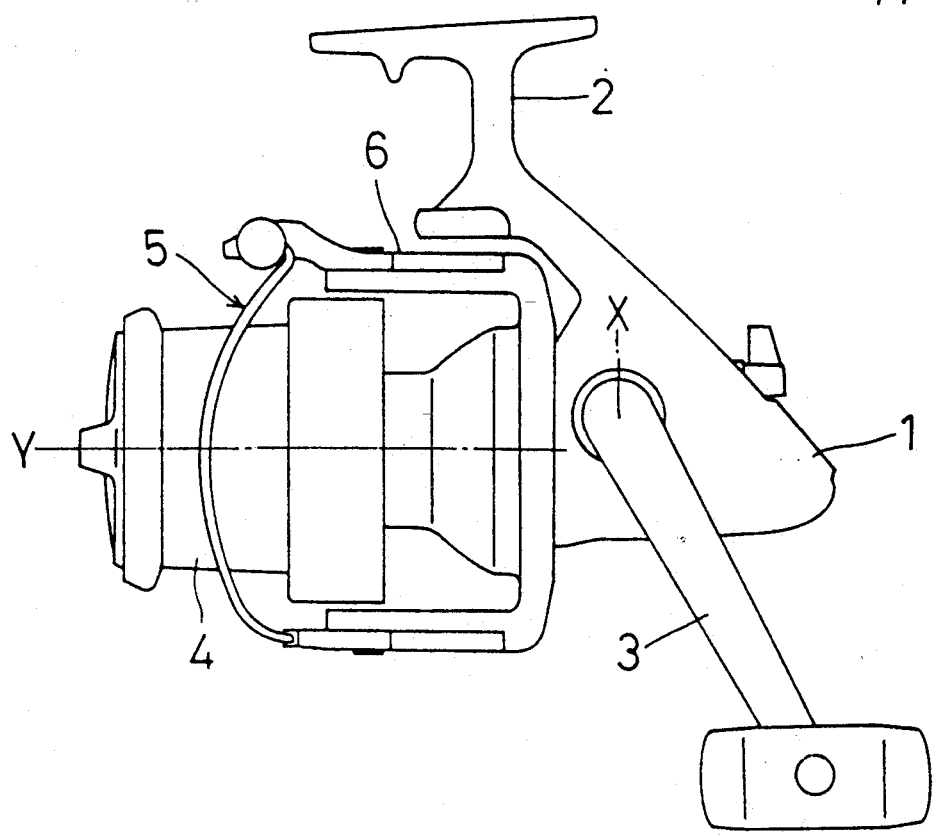

HANDLE FIXING STRUCTURE FOR SPINNING REEL

This application is a continuation of application Ser. No. 07/614,122 filed Nov. 16, 1990, now abandoned.

BACKGROUND OF THE INVENTION

1. Field of the Invention

The present invention relates to a handle fixing structure for a spinning reel.

2. Description of the Prior Art

Some of the conventional handle fixing structures can reduce the possibility of slack of a fixing bolt in a fastened condition by fitting a toothed washer and the like on the fixing bolt.

However, such a toothed washer only fitted on the fixing bolt does not function at all for preventing slack of the bolt when the bolt is so loosened that a bolt head is disengaged from the washer. This leads to further slack of the fixing bolt, which requires an improvement of the structure.

In order to prevent slack of the fixing bolt, the structure as disclosed in Japanese Utility Model "Kokai" No. 56-40314 has been proposed, which attempts to reliably prevent slack of the bolt through an extending and contracting effect of a resilient sleeve with fastening of a retaining screw.

However, a problem occurs when a reel structure includes a handle lever foldably pivotably connected to a handle shaft to select a folded position and an operational position by axial sliding movement of the handle shaft, wherein the retaining screw compatibly maintains the handle shaft and the handle lever in the operational position. That is to say, the above noted conventional structure has a jaw for preventing the resilient sleeve from being retracted inwardly, which is required to loosen the retaining screw to be disengaged from the handle shaft when the handle lever is folded by sliding the handle shaft. As a result, the handle lever and the handle shaft are often in danger of accidentally slipping out of a reel body.

SUMMARY OF THE INVENTION

An object of the present invention is to provide a handle fixing structure of a spinning reel comprising a fixing bolt for compatibly maintaining a handle lever in an operational position and a handle shaft, which facilitates pivotal movement for folding the handle lever and reliably prevents slack of the bolt.

In order to achieve the above object, the present invention is characterized by a handle fixing structure for a spinning reel comprising a reel body, a sleeve shaft rotatably supported inside the reel body, a drive gear integrally formed with an outer periphery of the sleeve shaft, a handle support shaft detachably fitted into and supported by the sleeve shaft for torque transmission, a handle lever foldably and pivotably supported by the handle support shaft, a fixing bolt inserted into the sleeve shaft from an end thereof opposite to the end for attaching the handle support shaft to be fixedly screwed to an inserting end of the support shaft, thereby to maintain the handle lever in a fixed operational position, the fixing bolt being loosened to permit the handle lever to be foldably pivotable, and an anti-slack element made of resin material disposed between the sleeve shaft and the fixing bolt to be unrotatable and axially slidable relative to the sleeve shaft for threadedly receiving the fixing bolt.

With this structure, after the handle support shaft is inserted into the sleeve shaft from one end thereof and the anti-slack element is inserted into the sleeve shaft from the other end thereof, the fixing bolt is screwed to the anti-slack element and to the handle support shaft, thereby to fix the handle lever. Thus, not only a head of the fixing bolt is fixedly fastened to an end face of the sleeve shaft, but also a threaded portion of the fixing bolt is screwed to the anti-slack element without defining a space therebetween, which reliably prevents clattering of a screwed engaging portion to the handle support shaft.

When the sleeve shaft is disengaged from the bolt head by loosening the fixing bolt to pivot the handle lever, the handle support shaft can be exposed outside by an amount corresponding to the loosened amount due to sliding movement of the handle support shaft and the anti-slack element relative to the sleeve shaft.

As a result, the handle lever can be pivoted while maintaining screw engagement between the handle support shaft and the fixing bolt, thereby to be readily folded eliminating the disadvantage of slipping out of the reel body. Furthermore, the handle lever is reliably prevented from clattering and slacking when fixed to the reel body under a friction force of the anti-slack element acting on the fixing bolt.

Other objects, structure and advantages according to the present invention will be apparent from the following description with reference to the accompanying drawings.

BRIEF DESCRIPTION OF THE DRAWINGS

The drawings show a handle fixing structure for a spinning reel embodying the present invention in which:

FIG. 3 is an exploded perspective view of elements of the handle fixing structure;

FIG. 4 is a partial section view along line 4—4 of FIG. 1; and

FIG. 5 is a side view of the spinning reel.

DESCRIPTION OF THE PREFERRED EMBODIMENTS

Figure 1:
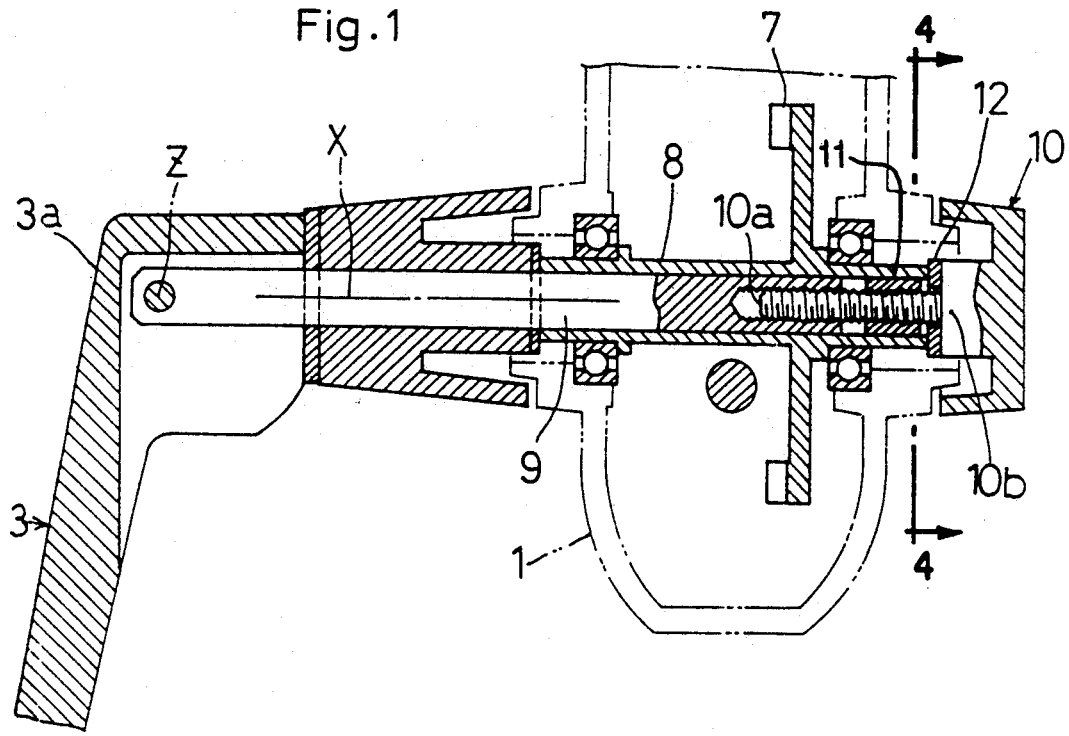
FIG. 1 is a partial sectional view showing a handle fixing condition.

The present invention will be described in detail hereinafter referring to the accompanying drawings.

FIG. 5 shows a spinning reel concerning the present invention, which comprises a reel body 1, a pole mount 2 continuing from the reel body 1, a pivotable handle lever 3 extending laterally outwardly from one side of the reel body 1, and a fishing line winding-up spool 4 mounted on a front portion of the reel body 1. The spool 4 carries a rotor 6 in its outer circumference with a bail arm mechanism 5 for guiding a fishing line.

When the handle lever 3 is pivoted about a horizontal axis X, the rotor 6 with the bail arm mechanism 5 is pivotably driven about a longitudinal axis Y through a drive gear 7 mounted inside the reel body 1, and the spool 4 is reciprocated along the longitudinal axis Y in a predetermined stroke.

The handle lever 3 is attachable to either lateral side of the reel body 1 depending on handedness of the fisherman, and is foldably pivotable at a proximal end thereof about an axis Z perpendicular to the axis X and to an arm portion 3a of the handle lever 3.

Figure 2:
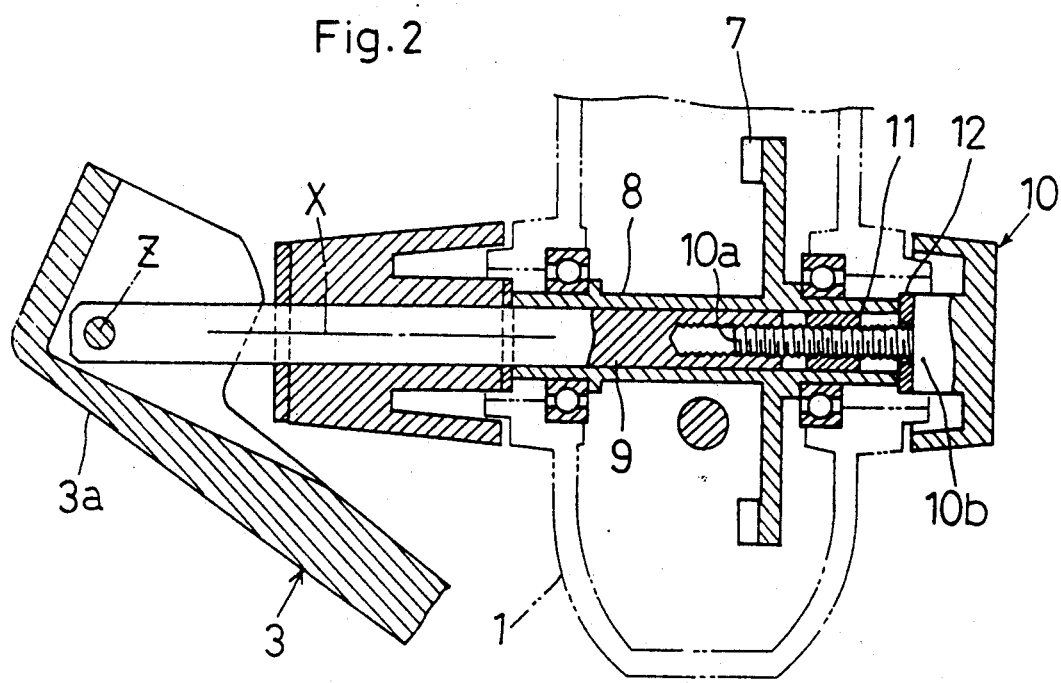
FIG. 2 is a partial sectional view showing a handle folding condition.

A handle fixing structure of the present invention will be set forth next. As shown in FIGS. 1 and 2, inside the reel body 1 is rotatably supported a sleeve shaft 8 integrally forming the drive gear 7 in an outer periphery thereof. A handle support shaft 9 for foldably and pivotably supporting the handle lever 3 is detachably fitted into and supported by the sleeve shaft 8 for torque transmission. A fixing bolt 10 is inserted into the sleeve shaft 8 from an end opposite to the end for attaching the handle support shaft 9 to be fixedly screwed to an inserting end of the handle support shaft 9, thereby to maintain the handle lever 3 in a fixed operational position. The handle lever 3 is foldably pivotable by loosening the fixing bolt 10. More particularly, the sleeve shaft 8 has a rectangular inner periphery and the handle shaft 9 has a rectangular outer periphery to be fitted to the inner periphery of the sleeve shaft 8.

An anti-slack element 11 made of resin material is disposed between the sleeve shaft 8 and the fixing bolt 10 to be unrotatable and axially slidable relative to the sleeve shaft 8, which anti-slack element threadedly receives the fixing bolt 10. More particularly, the anti-slack element 11 is made of synthetic resin, e.g. nylon, and has a rectangular configuration to be fitted into the sleeve shaft 8, and also defines a bore 11a in a core portion thereof having substantially the same diameter as a major diameter of a threaded portion 10a of the fixing bolt 10. The fixing bolt 10 is screwed into the bore 11a thereby to threadedly fit to an inner periphery of the bore 11a. A retaining washer 12 is disposed between a bolt head 10b and an end face of the sleeve shaft 8.

With the above noted structure, the fixing bolt 10 is prevented from slacking by being fastened to be axially fixed through the washer 12. The threaded portion 10a of the fixing bolt 10 is in contact with the anti-slack element 11 substantially without defining a space therebetween, e.g., threadedly press-fitted, thereby to prevent clattering to further ensure an anti-slack effect.

When the fixing bolt 10 is loosened, allowances are produced between the bolt head 10b, the washer 12 and the end face of the sleeve shaft 8. In this loosened condition, the handle support shaft 9, the anti-slack element 11 and the fixing bolt 10 are slidable to foldably swing the handle lever 3.

The fitting portion between the sleeve shaft 8 and the anti-slack element 11 is not limited to the rectangular configuration, but may be varied such as a hexagonal splined configuration and the like.

The washer 12 may be toothed to be unrotatable in order to enhance the anti-slack effect.

What is claimed is:

1. A handle fixing structure for a spinning reel comprising:
   a reel body (1),
   a sleeve shaft (8) rotatably supported inside the reel body (1), said sleeve shaft having first and second ends, said ends being spaced apart from each other in an axial direction,
   a drive gear (7) integrally formed with an outer periphery of the sleeve shaft (8),
   a handle support shaft (9) detachably supported by the sleeve shaft (8) for torque transmission, said handle support shaft having an inserting end, said inserting end being fitted into said first end of said sleeve shaft,
   a handle lever (3) foldably and pivotably supported by the handle support shaft (9),
   a fixing bolt (10) with a threaded portion (10a) inserted into the sleeve shaft (8) from said second end of said sleeve shaft, said fixing bolt being fixedly screwed to said inserting end of the handle support shaft (9), the fixing bolt being tightened to slide said handle support shaft toward said fixing bolt relative to said sleeve shaft (8) thereby to fixedly maintain the handle lever (3) in a fixed operational position, the fixing bolt being loosened to permit the handle lever (3) to be foldably pivotable, and
   an anti-slack element (11) made of resin material disposed between the sleeve shaft (8) and the fixing bolt (10), said anti-slack element being located on said threaded portion of said fixing bolt, said anti-slack element being non-rotatable relative to the sleeve shaft (8) and axially slidable entirely into said sleeve shaft, said anti-slack element having first and second ends, both of said ends of said anti-slack element being located entirely within said sleeve shaft, with said ends of said anti-slack element being spaced apart from said second end of said sleeve shaft in the axial direction, said anti-slack element having a bore (11a) which is axially aligned with the sleeve shaft (8) and the threaded portion (10a) of the fixing bolt (10), wherein the inner diameter of the bore (11a) is smaller than the outer diameter of the threaded portion (10a) of the fixing bolt (10), and wherein the threaded portion (10a) of the fixing bolt (10) is threadedly press-fitted into the bore (11a).

2. A handle fixing structure for a spinning reel as claimed in claim 1, wherein said handle support shaft is axially slidable in said sleeve shaft by an amount corresponding to a loosened distance of said fixing bolt.

3. A handle fixing structure for a spinning reel as claimed in claim 1, wherein said fixing bolt receives a washer in contact with said sleeve shaft.

4. A handle fixing structure for a spinning reel as claimed in claim 1, wherein said sleeve shaft and said anti-slack element are fitted with each other through a surface to surface engagement thereof with configurations having non-circular sections.

5. A handle fixing structure for a spinning reel as claimed in claim 1, wherein said anti-slack element is made of nylon resin.

6. A handle fixing structure for a spinning reel as claimed in claim 1, wherein an inner surface of said sleeve shaft and an outer surface of said anti-slack element have similar non-circular cross-sectional configurations and are thereby engageable with each other.

* * * * *